United States Patent [19]
Shimizu

[11] Patent Number: 5,833,023
[45] Date of Patent: Nov. 10, 1998

[54] VEHICLE BODY OF ELECTRIC VEHICLE

[75] Inventor: Hiroshi Shimizu, Ibaragi-ken, Japan

[73] Assignee: Kokuritsu Kankyo Kenkyusho, Ibaragi-ken, Japan

[21] Appl. No.: 646,554

[22] Filed: May 8, 1996

Related U.S. Application Data

[63] Continuation of Ser. No. 199,634, Feb. 22, 1994, abandoned.

[30] Foreign Application Priority Data

Feb. 23, 1993 [JP] Japan .................................. 5-056384

[51] Int. Cl.$^6$ .................................................. B60R 16/04
[52] U.S. Cl. ..................................... 180/68.5; 296/37.14
[58] Field of Search ................................ 180/68.5, 69.1, 180/60; 104/34; 105/49, 50, 51; 296/37.1, 37.14, 204, 205; 429/120; 280/782, 783

[56] References Cited

U.S. PATENT DOCUMENTS

| | | | |
|---|---|---|---|
| 384,576 | 6/1888 | Hunter | 180/65.1 |
| 649,491 | 5/1900 | Sperry | 429/120 |
| 746,289 | 12/1903 | Chamberlain | 429/120 |
| 1,165,784 | 12/1915 | Klingelsmith | 180/68.5 |
| 1,551,594 | 9/1925 | Walter | 180/65.1 |
| 3,110,633 | 11/1963 | Bachmann | 429/120 |
| 3,837,918 | 9/1974 | Nakabayashi | 429/120 |
| 3,983,952 | 10/1976 | McKee | 180/68.5 |
| 4,058,182 | 11/1977 | Huber | 180/68.5 |
| 4,216,839 | 8/1980 | Gould et al. | 104/34 |
| 4,306,000 | 12/1981 | Kodali | |
| 4,339,015 | 7/1982 | Fowkes et al. | 180/68.5 |
| 4,365,681 | 12/1982 | Singh | 180/68.5 |
| 4,406,342 | 9/1983 | Lacroix | 180/68.5 |
| 4,758,358 | 7/1988 | Lum et al. | 508/122 |
| 5,015,545 | 5/1991 | Brooks | 180/68.5 |
| 5,212,024 | 5/1993 | Klink et al. | 429/120 |
| 5,251,721 | 10/1993 | Ortenheim | 180/65.2 |
| 5,316,872 | 5/1994 | Baer | 429/120 |
| 5,373,910 | 12/1994 | Nixon | 180/68.5 |

FOREIGN PATENT DOCUMENTS

| | | | |
|---|---|---|---|
| 867778 | 9/1941 | France | 180/68.5 |
| 1011256 | 7/1952 | France | 180/68.5 |
| 2249544 | 5/1975 | France | 180/68.5 |
| 2662404 | 11/1991 | France | 296/37.14 |
| 4032605 | 3/1992 | Germany | 180/68.5 |
| 0224887 | 10/1991 | Japan | 180/68.5 |

*Primary Examiner*—Brian L. Johnson
*Assistant Examiner*—Min Yu
*Attorney, Agent, or Firm*—Armstrong, Westerman, Hattori, McLeland & Naughton

[57] ABSTRACT

A vehicle body of an electric vehicle driven by a battery includes a floor structure partitioned into a plurality of frame members. The frame members serve as side frames, reinforcing frames and also as battery accommodating frames into which batteries are accommodated. Further, the problem of the generation of heat in the battery is overcome by the use of holes provided in the frame members to permit the passage of air or the use of a passage to permit the flow of a cooling fluid.

10 Claims, 4 Drawing Sheets

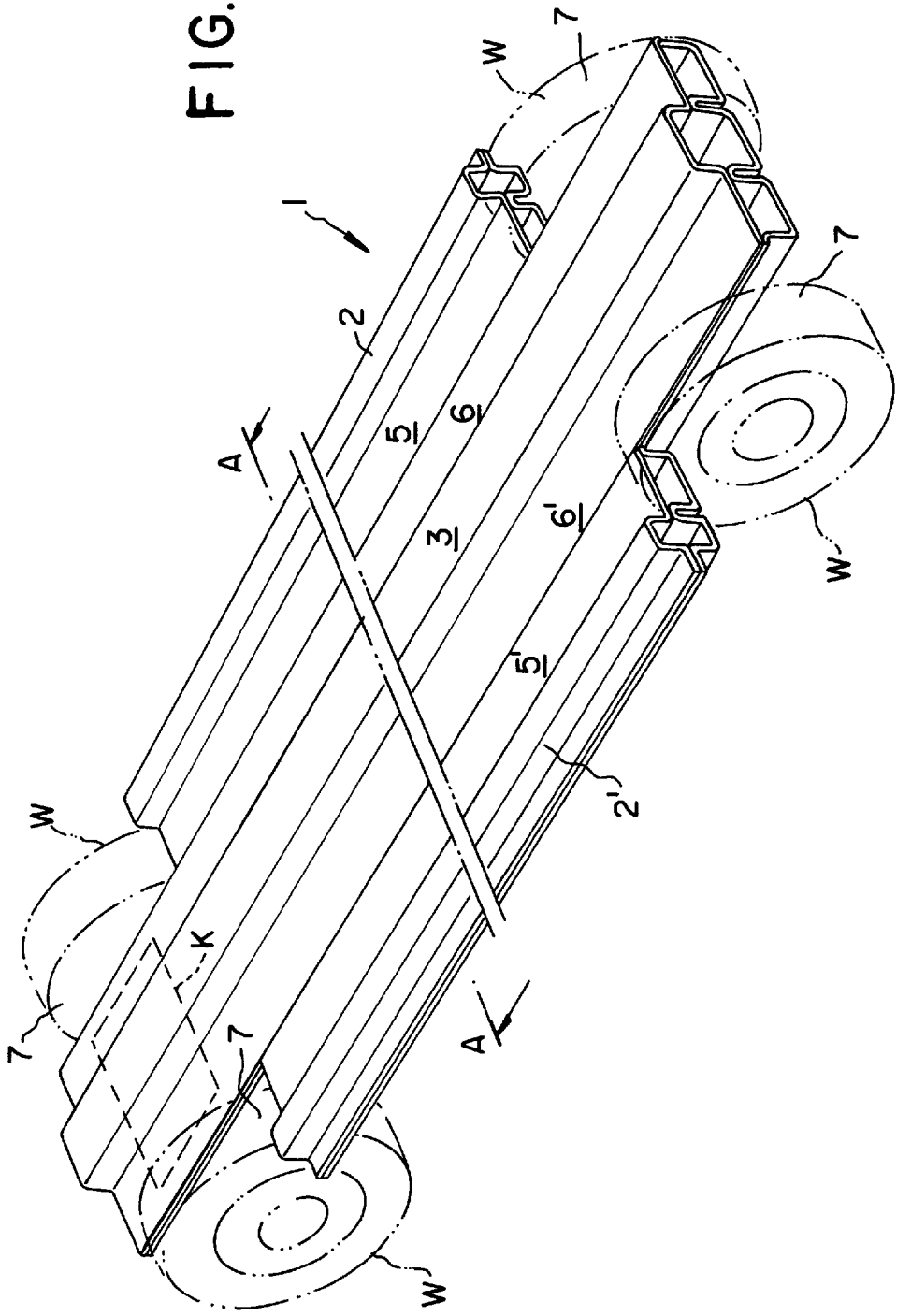

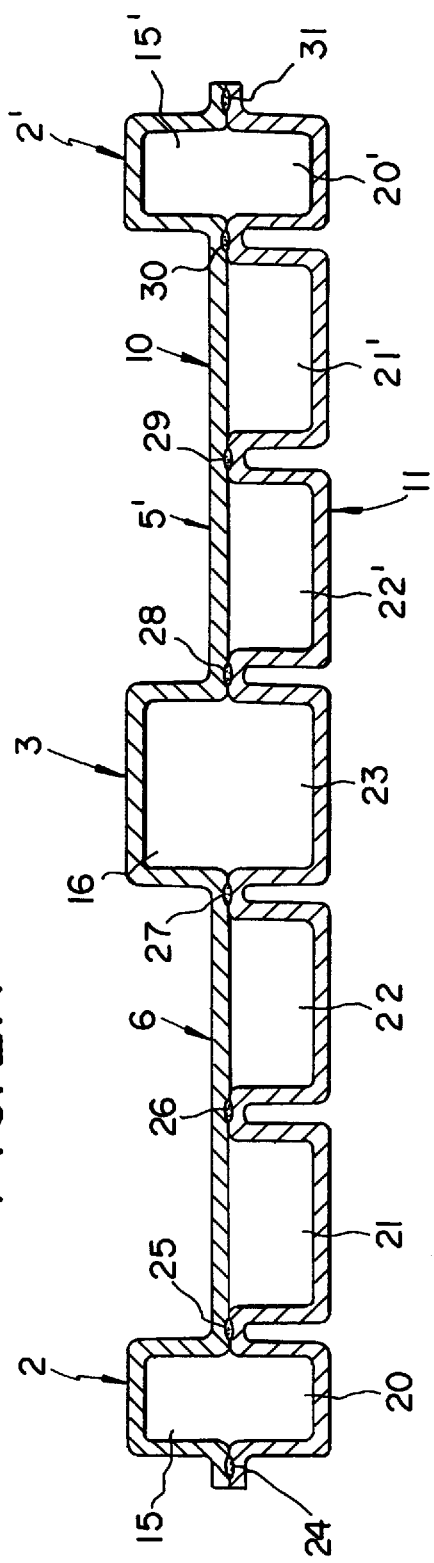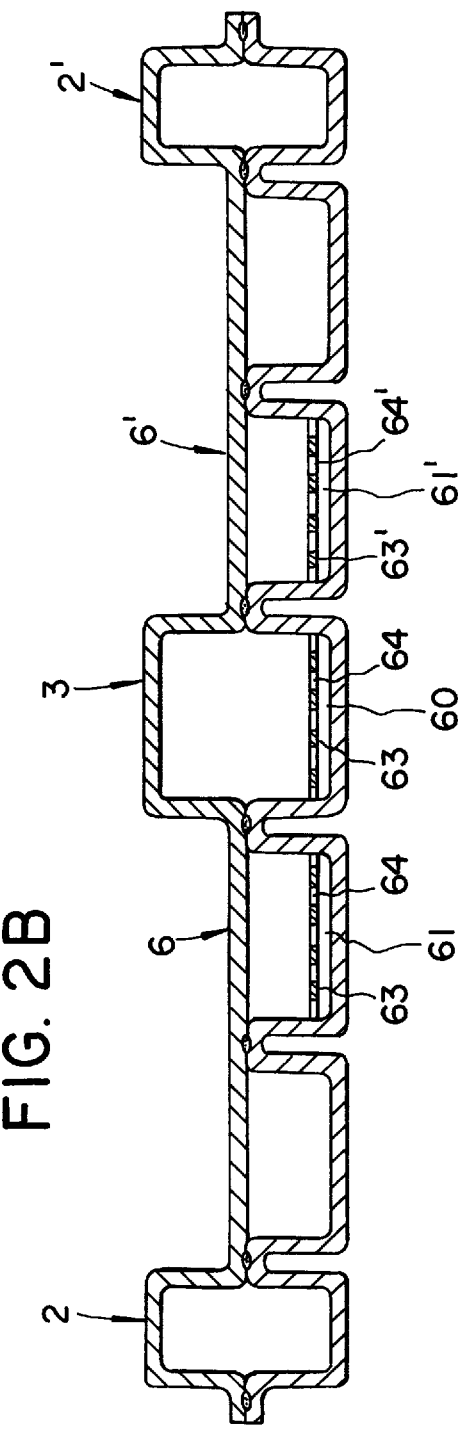

VEHICLE BODY OF ELECTRIC VEHICLE

This application is a continuation application Ser. No. 08/199,634 filed Feb. 22, 1994, now abandoned.

BACKGROUND OF THE INVENTION

1. Field of the Invention

The present invention relates to a vehicle body of an electric vehicle such as a four-wheel electric vehicle driven by a battery.

2. Description of the Prior Art

In contrast to a vehicle driven by an internal combustion engine in which a fossil fuel is burned, an electric vehicle is driven by an electric motor and hence, has no problems of exhaust gas and is reaching the stage of practical use.

The structure of the vehicle body can be classified broadly into a simple structure or a monocoque structure and a framed structure. The simple structure is a vehicle body structure including frames which are not independent from the vehicle body and which is formed by reinforcing structural members for the vehicle body and/or incorporating strength members. As shown in FIG. 7, the floor structure of the vehicle body is generally formed from side frames 60 and 60' located at opposite sides, a center frame 61 located centrally, reinforcing frames 62 and 62' located on opposite sides of the center frame 61, and the like. Each of these frames 60 to 62' is formed from a hollow member having a substantially rectangular section, as shown in FIG. 7. Therefore, a body formed from these frames 60 to 62' has a relatively high torsion rigidity.

The simple structure has features that the frames are not independent from the vehicle body and is lightweight for a high torsion rigidity. This type of above-described simple structure is chiefly employed for a body for an electric vehicle.

The weight of a battery for supplying electricity to the electric motor can amount up to or more than 10% of the electric vehicle. Conventionally such a heavy battery is accommodated into the vehicle in a following manner: The battery is accommodated in a container manner which comprises providing an independent accommodating space provided below a bonnet, trunk or a carrier formed by a vehicle body having a simple structure as described above, mounting a container for the battery in the space, and accommodating the battery into the container.

A battery mounting process referred to as a backbone manner is also known, as described in Japanese Patent Application Laid-open No. 35023/77. The backbone manner comprises providing a tunnel-like accommodating casing in a longitudinal direction of a vehicle and introducing or removing the battery from the front and rear of the accommodating casing.

The battery can be accommodated even by the above-described container manner for accommodating the battery into the container provided independently. However, the container manner suffers from a disadvantage that a significant space within the vehicle body is wasted, because an independent accommodating space must be provided below a bonnet, trunk or a carrier. Another disadvantage associated with the container manner is that the weight of the vehicle body is increased, because a container exclusively used for the battery must be specially provided. Further, there is a problem that because a heavy battery must be mounted, a reinforcing member for increasing the rigidity of the vehicle body is required, which increases the weight of the vehicle body even more.

In the electric vehicle described in the above-described Japanese Patent Application Laid-open No. 35023/77, the longitudinal tunnel-like accommodating casing is provided with cooling vent holes, through which air flows during movement of the vehicle when the battery has been accommodated, and therefore, a problem of a heat generated when an electric energy is taken out from the battery during use of the vehicle, is solved to a certain extent. However, the tunnel-like accommodating casing provided in the vehicle results in the weight of the vehicle body being increased. In addition, the heavy battery must be mounted, creating the problem that a reinforcing member for enhancing the rigidity of the vehicle body is required, which increases the weight of the vehicle body even more. Further, the accommodating casing is provided below the floor, resulting in a problem that the space between the floor and a ground surface is reduced. If the spacing is increased a problem still occurs in that significant space in the vehicle body must be sacrificed.

The battery must be charged upon traveling of the vehicle through a given distance. However, when the battery is charged, gas is produced along with a heat and hence, it is usual that an occupant must get out of the vehicle when the battery is to be charged. In addition, because of a long charging time, the battery may be replaced by a charged battery in many cases. For this reason it is desirable that the structure is such that the accommodation and removal of the battery can be simply performed. However, if the structure is simplified, problems may occur when the vehicle is in an accident or the like, and the structure allows the heavy battery to break loose from the bonnet, trunk or the like and injure the driver.

SUMMARY OF THE INVENTION

Accordingly, it is an object of the present invention to provide a vehicle body of an electric vehicle, wherein the weight of the vehicle body is not particularly increased, and neither a battery accommodating space nor a member for enhancing the rigidity of the vehicle body are required. In addition to this object, it is also an object of the present invention to provide a vehicle body of an electric vehicle, wherein the problem of the generation of heat in the battery is overcome, and the battery can be easily handled.

To achieve the above object, according to a first feature of the present invention, there is provided a vehicle body of an electric vehicle driven by a battery, comprising a floor structure which is partitioned into a plurality of frame members, wherein the frame members serve as side frames or reinforcing frames and also serve as battery accommodating frames into which batteries are accommodated.

Therefore, the doors can be attached to the side frames, while the seats can be attached to the reinforced frames, and the batteries can be accommodated into the battery accommodating frames. The battery accommodating frames each include a structural member having a closed section and constitute the floor together with other side frames, reinforced frames and the like. This provides an effect that a battery having a large weight can be mounted, even if any particular reinforcing member having a large strength is not provided. In addition, a special reinforcing member is not required, which makes it possible to produce a lightweight vehicle body. Further, since the battery accommodating frames constitute the floor together with other side frames, reinforced frames and the like, (i.e., since the battery accommodating frames are not special frames for accommodating the batteries, but are also frames constituting the floor) the compartment does not need to be narrowed.

According to a second feature, a section of the frame member is square or rectangular and has a battery inserting opening defined at an end thereof.

With this feature, an effect is provided that a battery having cubic shape convenient for handling can be accommodated. Additionally, the battery inserting opening is defined at the end of each of the battery accommodating frames and therefore, utilizing the battery inserting opening, the battery can be introduced or removed.

According to a third feature, a battery fixing means is provided at the battery inserting opening.

With this feature, after accommodation of the battery in the battery accommodating frame, the battery can be fixed. Thus, during traveling of the vehicle, the battery cannot be moved, and a safety to an accident and the like is provided.

According to a fourth feature, the structural member according to the above third feature, having the closed section and selected as the battery accommodating frame, is provided with through-bores such as holes, slits and the like for cooling or inspecting the battery. Therefore, it is possible heat generated in the battery to escape via the through-bores to the outside, and to introduce cooling air. Further, the battery can be inspected while remaining accommodated in the battery accommodating frame.

According to a fifth feature, the battery accommodating frame has a non-volatile liquid applied thereto. Therefore, the battery can be accommodated into and removed from the battery accommodating frame by sliding it with a small force. Further, the non-volatile liquid improves the close contact of the battery with the battery accommodating frame, thereby providing an effect of enhancing the heat conduction from the battery to the battery accommodating frame to better allow heat generated in the battery to escape.

According to a sixth feature, the inside of the frame member according to the fifth feature, is partitioned longitudinally into a battery accommodating portion and a passage portion for permitting the flow of a battery cooling fluid therethrough. Therefore, in addition to the above mentioned fifth feature, the battery accommodated in the battery accommodating frame can be cooled by flowing of the cooling fluid through the passage portion.

According to a seventh feature, the passage portion for permitting flowing of the battery cooling fluid therethrough is located below the battery accommodating portion. Therefore, in addition to the above feature, there is provided an effect that the battery is protected, even if an obstacle such as a protrusion on a road strikes the floor.

According to an eighth feature, the passage portion for permitting the flow of the battery cooling fluid therethrough according to the sixth feature is a condensing portion of a heat pipe, so that a heat generated in the battery is released effectively.

With such construction, a heat generated in the battery is used for the evaporation of a working liquid, so that the temperature of the battery is lowered. The evaporated working fluid is condensed at the condensing portion, for example, by air flowing through the passage portion, and therefore, the battery can be cooled effectively.

The above and other objects, features and advantages of the invention will become apparent from the following description of preferred embodiments, taken in conjunction with the accompanying drawings.

BRIEF DESCRIPTION OF THE DRAWINGS

FIG. 1 is a perspective view diagrammatically illustrating a first embodiment of the present invention;

FIG. 2A is a sectional view of the first embodiment taken in a direction of an arrow A—A in FIG. 1;

FIG. 2B is a sectional view of a second embodiment taken in a direction of an arrow B—B in FIG. 1;

DESCRIPTION OF THE PREFERRED EMBODIMENTS

Figure 3:
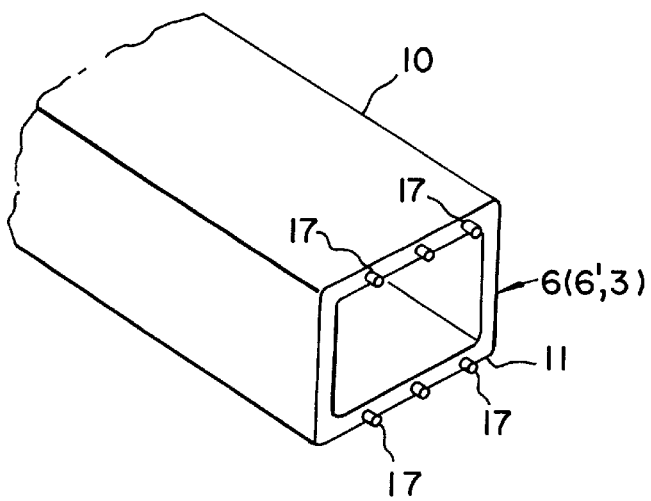
FIG. 3 is an enlarged perspective view of an end of an accommodating frame.

An embodiment of the present invention will now be described. FIG. 1 is a diagrammatic perspective view of the floor structure of a passenger vehicle according to this embodiment. As shown in FIG. 1, a floor 1 is formed from seven hollow members having a substantially rectangular section to form a substantially flat surface. More specifically, the floor 1 is formed from side frames 2 and 2', a center frame 3 centrally positioned, and accommodating frames 5, 6, 5' and 6' positioned between the side frames 2 and 2' and the center frame 3. These frames are disposed to provide a predetermined width, so that doors will be attached to the side frames 2 and 2', and a seat will be attached to the center frame.

The side frames 2 and 2' and the accommodating frames 5 and 5' are shorter than the other frames 3, 6 and 6', as if the respective opposite ends thereof have been cut off, and spaces 7, 7, are provided at sides of the accommodating frames 6 and 6'. Wheels W, W, are disposed in the spaces 7, 7, respectively.

As described above, the floor 1 is formed from the side frames 2 and 2', the center frame 3 and the accommodating frames 5, 6, 5' and 6' to provide a predetermined width. A method for forming the floor 1 is not particularly limited, but in this embodiment, the floor 1 is formed from two plate materials by folding, as shown in FIG. 2A. More specifically, the floor 1 is formed from an upper plate 10 positioned in a compartment upon assembling thereof, and a lower plate 11 positioned outside the compartment upon assembling thereof. The upper plate 10 has recesses 15 and 15' lengthwise defined thereon with their lower faces opened, and a recess 16 centrally defined thereon with its lower face likewise opened.

The lower plate 11 forms a pair with the upper plate 10 and has recesses 20, 21, 22 and 23 and 22', 21' and 20' defined thereon with their upper faces opened. The upper and lower plates 10 and 11 are positioned with the recesses 15, 15' and 16 on the upper plate 10 aligned with the recesses 20, 20' and 23 on the lower plate 11, respectively, and then integrally coupled to each other, for example, by spot welding at flanges 24 to 31. In this manner, the side frames 2 and 2' having the substantially rectangular section are formed on the opposite sides; the center frame 3 is formed centrally; and the accommodating frames 5, 6, 5' and 6' are formed on the opposite sides of the center frame 3.

According to this embodiment, the floor 1 is formed from the plurality of hollow frames each having the substantially rectangular section and therefore, a battery (a chargeable battery, i.e.) can be accommodated in any of the frames 2, 2' to 6, 6'. However, an embodiment in which a battery is accommodated in each of the widthwise centrally positioned center frame 3 and the accommodating frames 6 and 6' will be described below.

Each of the accommodating frames 6 and 6' and the center frame 3 is formed from a hollow material having a substantially rectangular section and hence, the battery can be accommodated from either the front or the rear. In the embodiment shown in FIG. 1, a driving device K comprising a drive motor for driving front wheels, a reduction gear and the like is disposed at a front portion of the vehicle, so that the battery may be introduced and removed from the rear.

FIG. 3 is a perspective view illustrating a rear end of the accommodating frame 6 representative of the frames 3, 6 and 6' for accommodating the batteries. As shown in FIG. 3, a plurality of outwardly protruding projections 17, 17, are provided on a wall of a battery-inserting opening defined at the opened ends of the upper and lower plates 10 and 11. These projections 17, 17, —form a battery fixing means in the first embodiment.

An example of a battery accommodated in each of the accommodating frames 6 and 6' and the center frame 3 will be described below. In general, a battery for an electric vehicle assumes a cube having side lengths on the order of 2 cm×20 cm×20 cm, or a cube having a size twice as large as such cube. Using this battery as one cell, a plurality of these cells are connected in series and used as a battery set.

Figure 4:
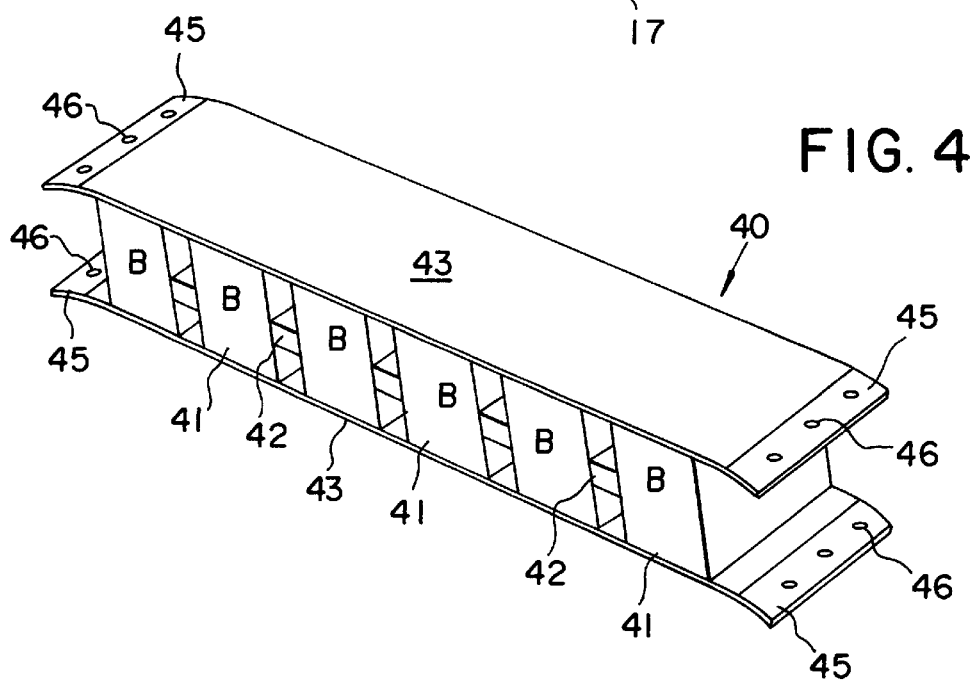
FIG. 4 is a perspective view illustrating an example of a battery set.

Thereupon, even in this embodiment, using one or two cells as one unit, a plurality of units are connected in series and used as a battery set. In the battery set 40, a plurality of unit cells 41, 41, are electrically connected in series. The unit cells 41, 41, are also mechanically connected to one another by two upper and lower flexible sheets 43, 43 with spacers 42, 42 interposed between, as shown in FIG. 4. Each of the flexible sheets 43, 43 is formed into a thin film, for example, from a synthetic resin, and has a satisfactory tensile strength. Therefore, for example, even if the connection of the vehicle gives rise to an accident, the unit cells cannot be broken.

The flexible sheets 43, and 43 are reinforced at their opposite ends by reinforcing materials 45, 45 placed one on another. The reinforced portions is provided with a plurality of through-bores 46, 46, corresponding to the plurality of projections 17, 17, provided at the ends of the upper and lower plates 10 and 11.

Figure 5:
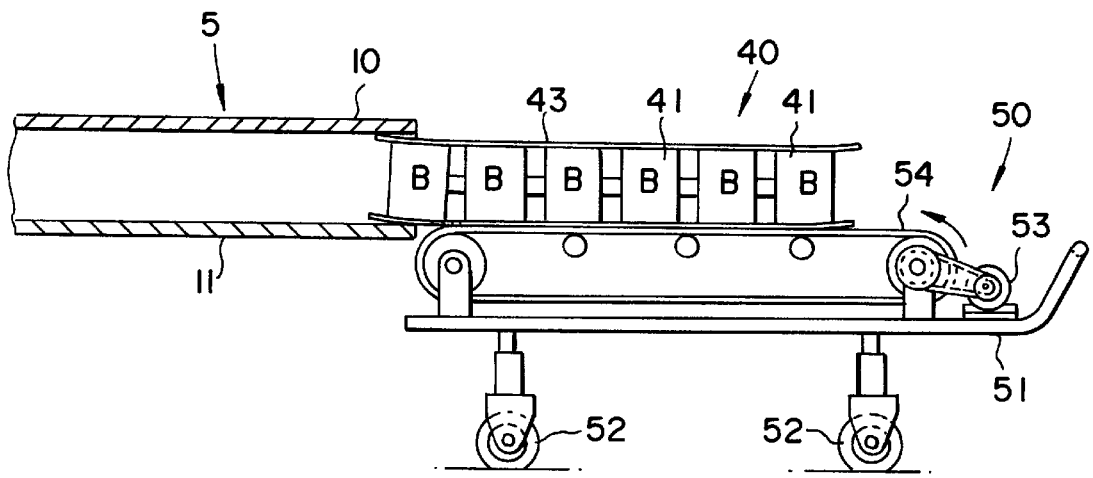
FIG. 5 is a side view illustrating the battery set in an accommodated state.
Figure 6:
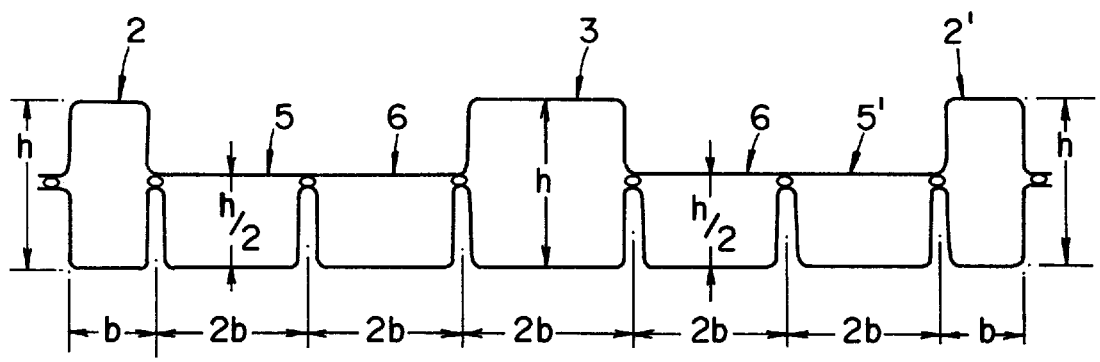
FIG. 6 is a diagrammatic sectional view of the first embodiment shown in FIG. 2A.

The battery set 40 can be accommodated, even if any device is used on the accommodating frames 6 and 6' and the center frame 3. A way to accommodate the battery set by use of a carriage 50 is shown in FIG. 5. The carriage 50 includes a frame 51. The frame 51 is freely adjustable in height relative to wheels 52, 52. A belt conveyer 54 driven by a motor 53 is mounted on the frame 51. A handle is mounted on the frame 51, but is not shown.

The operation of this embodiment will be described below. The battery set 40 is placed onto the belt conveyer 54 of the carriage 50. The battery set 40 is transported to a place of an stopped electric vehicle. Then, the height of the carriage 50 is adjusted, so that a lower surface of the battery set 40 is located slightly above the lower plate 11 of the accommodating frame 6. The motor 53 is started to drive the belt conveyer 54 in a direction indicated by an arrow. This causes the battery set 40 to be accommodated into the accommodating frame 6. A state in which about half of the lead unit cell 41 has been accommodated is shown in FIG. 5.

When the last unit cell 41 has been accommodated, for example, by pushing by hand, the through-bores 46, 46 in the upper and lower flexible sheets 43, 43 are fitted over the projections 17, 17 of the upper and lower plates 10 and 11 shown in FIG. 3. If required, the battery inserting opening at the opened end of the accommodating frame 6 may be closed by a lid or the like.

In the same manner, the battery set 40 is also accommodated into each of the other accommodating frame 6' and the center frame 3. The removal of the battery set 40 may be conducted in the reverse procedure.

It should be noted that if the width of the belt conveyer 54 set at a value corresponding to the accommodating frames 6 and 6' and the center frame 3, the battery sets can be accommodated at one time into these frames 3, 6 and 6'.

According to this embodiment, various effects are provided and will be described below using numerical expressions.

Figure 7:
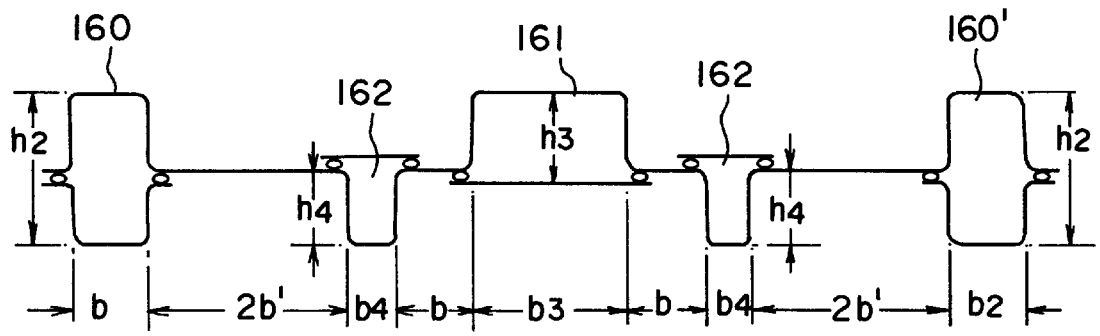
FIG. 7 is a sectional view diagrammatically illustrating a prior art example.

FIG. 7 is a sectional view diagrammatically illustrating a cross-section of a floor structure of a prior art vehicle. As shown in FIG. 7, if the height and width of the side frame 160, 160' are represented by $h_2$ and $b_2$, respectively; the height and width of the center frame 161 is by $h_3$ and $b_3$, respectively; and the height and width of the reinforced frame 162, 162' are by $h_4$ and $b_4$, respectively, a modulus of section $Z_1$ proportional to the strength of a beam is given by a following expression:

$$Z_1 = d/3 \times (6b_2h_2 + 2h_2^2) + d/6 \times (6b_3h_3 + 2h_3^2) + d/3 \times (6b_4h_4 + 2h_4^2) \quad (1)$$

a secondary moment of section $I_1$ inversely proportional to the deflection is represented by a following expression:

$$I_1 = d/6 \times (6b_2h_2^2 + 2h_2^3) + d/12 \times (6b_3h_3^2 + 2h_3^3) + d/6 \times (6b_4h_4^2 + 2h_4^3) \quad (2)$$

In a usual vehicle shown in FIG. 7, the following approximations can be established:

$$h_2 = 2h_3 = 2h_4 = h$$

$$b_2 = b_3/2 = 2b_4 = b$$

If so, the expressions (1) and (2) are replaced into following expressions:

$$Z_1 = (7/2 \times bh + 11/12 \times h^2)d \quad (3)$$

$$I_1 = (11/8 \times bh^2 + 19/48 \times h^3)d \quad (4)$$

If the width of the floor is represented by w and the thickness of a material is by d, the spacing between the side frame 50 and the reinforced frame 52 and the center frame 51 is equal to $2_b$, and the spacing between the reinforced frame 52 and the center frame 51 is equal to b. Therefore, a sectional area $S_1$ of the material is given by a following expression:

$$S_1 = (12b + 7h)d + (w - 6b)d = (6b + 7h + w)d \quad (5)$$

To the contrary, in this embodiment, if the height of the side frames 2 and 2' and the center frame 3 is represented by h; the height of the accommodating frames 6, 6' and 6, 6' is by h/2; the width of the side frames 2 and 2' is by b, and the width of the center frame 3 and the accommodating frames 5, 5', 6 and 6' is by 2b, a modulus of section $Z_2$ and a secondary moment of section $I_2$ in the beam structure formed from these frames 2, 2', 3, 5, 5', 6 and 6' is given by the following expressions:

$$Z_2 = d/3 \times (36wh + 5/6 \times dh^2) \quad (6)$$

$$I_2 = d/6 \times \{6 \times (b/2 + w/4) \ h^2 + 9/4 \times h^3\} \quad (7)$$

A sectional area $S_2$ of the material is given by the following expression:

$$S_2=(4b+7h+2w)d \quad (8)$$

If the expressions (3) and (4) are divided by the expression (5) and if the expressions (6) and (6) are divided by the expression (8), a modulus of section and a secondary moment of section per unit weight of the material in the respective beam structure are provided. Values thereof are as follows:

$$Z_1'=Z_1/S_1=(7/2\times bh+11/12\times h^2) / (6b+7h+w) \quad (9)$$

$$I_1'=I_1/S_1=11/8\times bh^2+19/48\times h^3) / (6b+7h+w) \quad (10)$$

$$Z_2'=Z_2/S_2=1/3\times(wh+5/6\times dh^2)/(4b+7h+2w) \quad (11)$$

$$I_2'=I_2/S_2=1/6\times\{6\times(b/2+w/4)h^2+9/4\times h^3\}/(4b+7h+2w) \quad (12)$$

If approximations of the expressions (9) to (12) is further advanced, approximations, h=2b and w=16b, can be established. If these are incorporated into the expressions (9) to (12), the following expressions are given:

$$Z_1'=8b/27 \quad (13)$$

$$I_1'=13b^2/54 \quad (14)$$

$$Z_2'=149b/225 \quad (15)$$

$$I_2'=21b^2/50 \quad (16)$$

If a ratio of the expression (13) to the expression (15) is represented by $r_Z$, and a ratio of the expression (14) to the expression (16) is represented by $r_I$, following the expressions are given:

$$r_Z=Z_2'/Z_1'=447/200=2.2 \quad (17)$$

$$r_I=I_2'/I_1'=567/325=1.74 \quad (18)$$

It will be appreciated from the above expression (17) that the structure according to the present embodiment has a rigidity as high as 2.2 times of that of the prior art structure, and from the expression (18) that it has a deflection reduced down to 1/1.74 of that of the prior art structure. Thus, according to the present embodiment, a high-strength and lightweight floor structure of an electric vehicle is provided.

Assuming that the battery set 40 is accommodated into each of the center frame 3 and the accommodating frames 6 and 6', the weight of the battery sets 40 is calculated.

If the width of the center frame 3 is represented by $w_3$, and the width and height of the accommodating frames 6 and 6' are by $w_5$ and n, respectively, a space capable of accommodating the battery set 40 therein is represented by the following expression:

$$V=nh(w_3+2w_5)/2 \quad (19)$$

If $w_3=w_5=w_d$, the following equation is established:

$$V=3w_dnh/2 \quad (20)$$

The size of the batteries constituting the battery set 40 is slightly smaller than the width $w_d$ of the center frame 3 and the accommodating frame 6 and 6', and the height thereof is also smaller than n, but assuming that such size and height are approximate to these numerical values, if the specific gravity of the battery is represented by δ, the weight M of the battery sets 40 capable of being accommodated is given by the following expression:

$$M=3\delta w_d nh/2 \quad (21)$$

The size of a usual vehicle is such that the entire length is 4.8 m; the entire width is 1.8 m, and the wheel base is about 2.7 m, and therefore, $w_d$, n and h can be set at 0.25 m, 3.4 m and 0.12 m, respectively (i.e., $w_d$=0.25 m, n=3.4 m and h=0.12 m). If the specific weight of the battery for the electric vehicle is 2.2, the weight M of the battery sets 40 capable of being accommodated in the center frame 3 and the accommodating frames 6 and 6' is as follows:

$$M=3\times2.2\times0.25\times3.4\times0.06=337 \text{ kg}$$

The entire weight of the batteries loaded on the electric vehicle is on the order of 300 to 500 kg and therefore, according to this embodiment, the batteries can be accommodated into the center frame 3 and the accommodating frames 6 and 6' without a sacrifice of the compartment space and without lowering of the floor.

The tensile strength of the two upper and lower flexible sheets 43, 43 will be described below. According to this embodiment, the battery sets 40 are accommodated separately into the center frame 3 and the accommodating frame 6 and 6' and hence, the weight of the battery set 40 accommodated in one frame is equal to M/3.

If an acceleration applied to the electric vehicle upon collision thereof is represented by NG, and if the flexible sheets 43, 43 are capable of withdrawing a load of N·M/3 kg, the connection of the unit cells 41, 41 cannot be broken.

If the width, the thickness, the tensile strength and the safety factor of the sheets 43, 43 are represented by $W_s$, $d_s$, $f_s$ and $s_s$, respectively, the following expression is established:

$$2w_s\times d_s\times f_s=s_s\times N\times M/3 \quad (22)$$

Provided that the flexible sheet 43, 43 is formed from a polyethylene terephthalate, the tensile strength fs thereof is equal to 10 kg/mm². The weight M of the battery sets 40 is of 337 kg. Hence, if N=10 G, $w_s$=250 mm, $f_s$=10 kg/mm and $s_s$=3, then $d_s$=0.67 mm is established. Thus, according to this embodiment, the unit cells 41, 41 can be retained at a predetermined position by extremely thin sheets 43, 43, even if a collision accident is given rise.

The present invention is not limited to the above-described embodiment, but can be carried out in the various forms. For example, when the electric vehicle is traveling, an electric energy is taken out from the batteries and hence, the batteries generate a heat therein. Thereupon, the batteries are required to be cooled. It should be noted that according to the present embodiment, the rigidity or the like of the floor 1 is increased, as compared with that of the prior art floor, as described above, and therefore, through-bores such as slits and holes through which cooling air is introduced and discharged can be provided properly in the center frame 3 and the accommodating frames 6 and 6'.

In addition, the inside of each of the center frame 3 and the accommodating frames 6 and 6' can be partitioned longitudinally, and one of chambers resulting from such partitioning can be used as a passage through which air for cooling the batteries flows. In this case, through-bores such as slits, holes and the like are provided in partitioning walls, so that the cooling air flows from the passage into the center frame 3 and the accommodating frames 6 and 6' having the batteries accommodated therein.

A modification is possible in which a liquid, e.g., cooling water is passed, in place of the air. In this case, it is desirable that the construction is such that water is circulated, and that a radiator for cooling the circulated water is provided.

Another modification is also possible in which the batteries are cooled by a heat pipe. For example, an evaporating portion of the heat pipe may be faced to a battery accommodating portion. A condensing portion of the heat pipe is mounted in the passage portion through which a battery cooling fluid is passed. With such construction, a heat generated in the battery is used for the evaporation of a working fluid and thus, the temperature of the battery is lowered. The evaporated working fluid is condensed into a liquid, for example, by air flowing through the passage portion in the condensing portion. In this manner, the batteries are cooled.

An embodiment is shown in FIG. 2B, in which passages 60, 61 and 61' through which a fluid as described above flows are provided below the center frame 3 and the accommodating frames 6 and 6'. Even in this embodiment, through-bores 64, 64, such as slits, holes and the like are opened in partitioning walls 63, 63 and 63'.

Therefore, if an air intake opening is provided, for example in a front portion, when the electric vehicle is traveled, air introduced through the air intake opening flows rearwardly within the passages 60, 61 and 61'. In this case, the air flows through the through-bores 64, 64, in the partitioning walls 63, 63 and 63' into the center frame 3 and the accommodating frames 6 and 6', thereby cooling the battery sets 40, 40, 40 accommodated in these frames. When a fluid is permitted to flow through the passages 60, 61 and 61', the construction is such that the fluid is circulated, as described above. However, such construction is not shown.

According to this embodiment, since the passages 60, 61 and 61' are provided below the center frame 3 and the accommodating frames 6 and 6' having the battery sets 40, 40, 40 accommodated therein, there is provided an effect that the battery sets 40, 40, 40 are protected even if an obstacle such as a protrusion on a road strikes the floor 1.

The battery fixing means can be embodied by machine screws. More specifically, threaded holes can be provided in ends of the upper and lower plates 10 and 11 and aligned with the through-bores in the upper and lower flexible sheets 43, 43, thereby attaching the batteries by the machine screws.

The battery sets 40, 40, 40 are accommodated into the center frame 3 and the accommodating frames 6 and 6' by sliding thereof and hence, for the purpose of improving the sliding, a non-volatile lubricant 70 may be applied to inner surfaces of the frames 3, 6 and 6' (see FIG. 2B, for example). The application of a lubricant also improves the close contact of the battery sets 40, 40, 40 with the center frame 3 and the accommodating frames 6 and 6', thereby providing an effect of enhancing the heat conduction to provide an improved release of a heat generated within the battery.

What is claimed is:

1. A vehicle body of an electric vehicle driven by a battery, comprising:
   a floor structure including a plurality of hollow beams, parallel to a direction of movement of the vehicle, serving as structure of the vehicle, each of said plurality of hollow beams including a battery accommodation section housing at least one battery, a battery inserting opening located on a longitudinal end of each hollow beam and a passage portion containing a battery cooling fluid to cool said at least one battery, said plurality of hollow beams thus including a plurality of battery accommodation sections having a plurality of batteries, a plurality of battery inserting openings and a plurality of passage portions, wherein said plurality of hollow beams include more than two hollow beams connected side by side.

2. A vehicle body of an electric vehicle according to claim 1, wherein said plurality of hollow beams are formed from an upper plate and a lower plate by folding, and have a square or rectangular cross-section and a battery inserting opening defined at an end thereof, said plurality of hollow beams thus including a plurality of battery inserting openings.

3. A vehicle body of an electric vehicle according to claims 1 or 2, further including a battery fixing means for fixing one or more batteries within said beam, said battery fixing means provided at each of said battery inserting openings.

4. A vehicle body of an electric vehicle according to claim 3, wherein said hollow beams are provided with holes for cooling and inspecting the battery.

5. A vehicle body of an electric vehicle according to claim 1, wherein said passage portion for permitting the flow of a battery cooling fluid therethrough is located below said battery accommodating portion.

6. The vehicle body of claim 1, wherein said battery cooling fluid is a liquid.

7. The vehicle body of claim 6, wherein said battery cooling fluid is water.

8. The vehicle body of claim 1, further comprising:
   a plurality of partitioning walls attached to inner walls of said hollow beams, defining along with said inner walls of said hollow beams said battery accommodation sections and said passage portions.

9. A vehicle body of claim 8, wherein said plurality of partition walls include holes permitting said cooling fluid to flow through said holes.

10. A vehicle body of claim 9, wherein said holes are slits.

* * * * *